United States Patent
Chen

(10) Patent No.: US 12,040,132 B2
(45) Date of Patent: Jul. 16, 2024

(54) ACTUATING MECHANISM FOR OBJECT DETECTION AND OBJECT DETECTION DEVICE

(71) Applicant: HUNAN XINLIANG ELECTRONIC CO., LTD, Yueyang (CN)

(72) Inventor: Yihua Chen, Yueyang (CN)

(73) Assignee: HUNAN XINLIANG ELECTRONIC CO., LTD, Yueyang (CN)

(*) Notice: Subject to any disclaimer, the term of this patent is extended or adjusted under 35 U.S.C. 154(b) by 619 days.

(21) Appl. No.: 17/229,895

(22) Filed: Apr. 14, 2021

(65) Prior Publication Data
US 2021/0257140 A1    Aug. 19, 2021

Related U.S. Application Data

(63) Continuation of application No. PCT/CN2019/116516, filed on Nov. 8, 2019.

(30) Foreign Application Priority Data

Nov. 9, 2018 (CN) .......................... 201811332855.9

(51) Int. Cl.
| H01F 7/14 | (2006.01) |
| G01F 23/22 | (2006.01) |
| H01F 7/02 | (2006.01) |

(52) U.S. Cl.
CPC .............. *H01F 7/14* (2013.01); *G01F 23/22* (2013.01); *H01F 7/02* (2013.01)

(58) Field of Classification Search
CPC ... H01F 7/14; H01F 7/02; H01F 7/122; G01F 23/22; G01F 23/2967; G01F 23/0007
(Continued)

(56) References Cited

U.S. PATENT DOCUMENTS

| 2,400,262 A | * | 5/1946 | La Vern | ................. | H02K 39/00 |
| | | | | | 310/36 |
| 2,556,348 A | * | 6/1951 | Thompson | .............. | E04G 25/08 |
| | | | | | 403/376 |

(Continued)

FOREIGN PATENT DOCUMENTS

| CN | 2136462 Y | 6/1993 |
| CN | 2522840 Y | 11/2002 |

(Continued)

OTHER PUBLICATIONS

NPL.*
Internation Search Report of PCT/CN2019/116516, Mailed Jan. 2, 2020.

*Primary Examiner* — Shawki S Ismail
*Assistant Examiner* — Lisa N Homza
(74) *Attorney, Agent, or Firm* — True Shepherd LLC; Andrew C. Cheng

(57) ABSTRACT

An actuating mechanism includes a main body, an electromagnetic device fixed to the main body, and a swinging rod swingably connected to the main body. A position of connection between the swinging rod and the main body is opposite to an iron core of the electromagnetic device, and an upper end of the swinging rod is opposite to and spaced apart from the electromagnetic device. A permanent magnet is disposed on the upper end of the swinging rod, and a magnetic pole direction of the permanent magnet and a magnetic pole direction of the electromagnetic device cross each other. Since the permanent magnet on the swinging rod is opposite to and spaced apart from the electromagnetic device, the swinging rod is not in contact with the electromagnetic device during working process. This avoids knocking of the swinging rod on other components, and therefore prevents noise, reduces wear.

9 Claims, 7 Drawing Sheets

(58) Field of Classification Search
USPC .............................................. 335/3
See application file for complete search history.

(56) References Cited

U.S. PATENT DOCUMENTS

| | | | | |
|---|---|---|---|---|
| 6,040,752 | A | * 3/2000 | Fisher | H01F 7/1615 335/229 |
| 2007/0169549 | A1 | * 7/2007 | Kwun | G01F 23/2965 73/290 V |
| 2008/0138247 | A1 | * 6/2008 | Inganas | G01N 35/00069 422/68.1 |
| 2009/0201504 | A1 | 8/2009 | Ho et al. | |
| 2013/0328552 | A1 | * 12/2013 | Chen | G01F 23/0023 324/207.15 |

FOREIGN PATENT DOCUMENTS

| | | | |
|---|---|---|---|
| CN | 1900665 A | | 1/2007 |
| CN | 101592251 A | * | 12/2009 |
| CN | 102155968 A | | 8/2011 |
| CN | 102214980 A | * | 10/2011 |
| CN | 206057596 U | | 3/2017 |
| KR | 100780148 B1 | * | 11/2007 |

* cited by examiner

ACTUATING MECHANISM FOR OBJECT DETECTION AND OBJECT DETECTION DEVICE

CROSS REFERENCE TO RELATED APPLICATIONS

This application is a continuation of International Patent Application No. PCT/CN2019/116516 with a filing date of Nov. 8, 2019, designating the United States, now pending, and further claims priority to Chinese Patent Application No. 201811332855.9 with a filing date of Nov. 9, 2018. The content of the aforementioned applications, including any intervening amendments thereto, are incorporated herein by reference.

TECHNICAL FIELD

The present disclosure relates to the field of material level sensors, and in particular, to an actuating mechanism for object detection and an object detection device.

BACKGROUND

In industrial production, many storage bins need to be measured on material level to find out which one is empty or full. Currently, the common object detection devices mainly include rotary resistance type, lever toggle type, tuning fork type, capacitance type, and radio frequency admittance type. Such types of object detection devices, when used in detection of material levels, usually have the disadvantages of short service life, poor reliability, and inaccurate detection results.

For example, China Patent No. CN102155968B provides an electromagnetic pushing and knocking-type object detection device, which includes a magnetic swinging rod; an electromagnet disposed on one side of the magnetic swinging rod, and an electronic module that controls the electromagnet to drive the magnetic swinging rod to swing, and amplifies, processes, and time-delay outputs signals, collected by the electromagnet, of the magnetic swinging rod. The magnetic swinging rod is suspended with a suspension device on one side of a main housing, and the electromagnet disposed inside the main housing is composed of an electromagnet iron core and an electromagnet coil. Such an electromagnetic pushing and knocking-type object detection device has the following problems in use: 1. The perpendicularity of the detector installed is highly required because tilting may lead to failure. 2. The knocking of the magnetic swinging rod on the housing of the electromagnet produces noise and results in additional wear as well as downgraded explosion-proof safety level. 3. The swinging rod with permanent magnet is in direct contact with the detected materials and may fail to swing because the magnetic swinging rod and the electromagnet are bonded together when strong adhesive materials are detected. 4. When used in detecting materials having ferromagnetic impurities such as iron ore, the magnetic swinging rod may be out of order because lots of impurities such as iron dust adhere thereto.

SUMMARY

An objective of the present disclosure is to provide an object detection device capable of improving its working stability.

Another objective of the present disclosure is to provide an object detection device capable of reducing the wear during detection process.

To achieve the above objectives, the present disclosure provides an actuating mechanism for object detection, including a main body, an electromagnetic device fixed to the main body, and a swinging rod swingably connected to the main body.

A position of connection between the swinging rod and the main body is opposite to an iron core of the electromagnetic device, and an upper end of the swinging rod is opposite to and spaced apart from the electromagnetic device.

A permanent magnet is disposed on the upper end of the swinging rod; and a magnetic pole direction of the permanent magnet and a magnetic pole direction of the electromagnetic device cross each other.

According to one aspect of the present disclosure, the main body may include a first mounting portion for mounting of the electromagnetic device, and a second mounting portion for mounting of the swinging rod.

The first mounting portion may be tubular with one end sealed; and the electromagnetic device may be disposed on an inner side of the first mounting portion, while the swinging rod may be located on an outer side of the first mounting portion.

According to one aspect of the present disclosure, a support shaft may be disposed on the second mounting portion. The swinging rod may have a first through hole which extends through the body of the swinging rod; and the swinging rod may be swingably connected to the support shaft via the first through hole.

According to one aspect of the present disclosure, the support shaft may be an arc-shaped shaft.

According to one aspect of the present disclosure, a flexible protective cover may be further disposed on the second mounting portion.

Side walls of the second mounting portion and the flexible protective cover may define a holding cavity. The permanent magnet, the upper end of the swinging rod and the support shaft may be all located within the holding cavity. The end, opposite to the upper end, of the swinging rod is located outside the holding cavity.

According to one aspect of the present disclosure, the second mounting portion may be tubular, and a first clamping structure for mounting of the flexible protective cover may be disposed at one end of the second mounting portion.

The flexible protective cover may have a second through hole for the swinging rod to pass through.

According to one aspect of the present disclosure, a first connecting rod may be disposed on the swinging rod.

The first connecting rod may be detachably connected to the swinging rod, and the flexible protective cover may be clamped at a position of connection between the swinging rod and the first connecting rod.

According to one aspect of the present disclosure, at least one of the swinging rod and the first connecting rod may be made of a diamagnetic material.

According to one aspect of the present disclosure, a second connecting rod may be further disposed on the swinging rod.

The second connecting rod may be coaxially connected to the first connecting rod via an elastic piece.

According to one aspect of the present disclosure, at least one of the swinging rod, the first connecting rod and the second connecting rod may be made of a diamagnetic material.

To achieve the above objectives, the present disclosure provides an object detection device, including an actuating mechanism, and an electronic module electrically connected to an electromagnetic device in the actuating mechanism.

In an implementation of the present disclosure, since the permanent magnet on the swinging rod is opposite to and spaced apart from the electromagnetic device, the swinging rod is not in contact with the electromagnetic device during working process. This avoids knocking of the swinging rod on other components, and therefore prevents noise, reduces wear, and improves the explosion-proof safety level. Moreover, high stability and long service life are realized. Since the swinging rod is suspended below the electromagnetic device, a driving force applied by the electromagnetic device to the swinging rod can be conveniently and efficiently adjusted by adjusting a gap therebetween, ampere turns of a coil of the electromagnetic device, an end area of the iron core and the magnetic induction intensity of the permanent magnet. Besides, cost saving is achieved.

In an implementation of the present disclosure, since the permanent magnet is disposed at the end of the swinging rod, the object detection device of the present disclosure is enabled to perform detection in inclined and even horizontal state due to the attraction between the permanent magnet and the iron core without power. The requirements on the perpendicularity of installation are reduced, and the object detection device can work reliably even when being inclined to a horizontal position. Thus, the object detection device of the present disclosure can be installed at different positions to work and used in broader range of application with higher applicability.

In an implementation of the present disclosure, since the magnetic pole direction of the permanent magnet and the magnetic pole direction of the electromagnetic device cross each other, since only one end of the iron core is opposite to the permanent magnet, the electromagnetic driving force generated by the electromagnetic device after being energized produces not only repelling force but also attraction with the permanent magnet, so that the electromagnetic driving force is doubled. Thus, the size of the electromagnetic device 12 can be greatly reduced, leading to material saving, reduction in production, transportation and storage costs as well as great reduction in power consumption. Furthermore, a two-wire product with micro-power consumption can be developed and manufactured, resulting in reduction of wiring cost of installation in use and energy saving. In addition, because the swinging of the swinging rod causes the magnetic flux in the coil to change not only in the magnitude of the magnetic flux but also in the direction, the signal of the swinging of the swinging rod collected after the electromagnetic device is powered off is also multiplied, which in turn makes the detection accuracy and sensitivity higher.

In an implementation of the present disclosure, with the flexible protective cover, the permanent magnet 1311 on the swinging rod can be isolated from the detected object, and therefore, such components as the swinging rod, the first connecting rod and the second connecting rod can be made of a diamagnetic material, so that the object detection device of the present disclosure can be used in detecting ferromagnetic materials and materials with high adhesion.

In an implementation of the present disclosure, since the size of the object detection device of the present disclosure is reduced, the obstruction to the normal flow of the detected materials is reduced, and cavities formed by the arching of detected materials are also reduced. Also, the leftover of the detected materials on the object detection device of the present disclosure is reduced and the reliability of signal output is improved.

DETAILED DESCRIPTION

To explain the technical solutions in embodiments of the present disclosure or in the prior art more clearly, the accompanying drawings required in the embodiments will be described below in brief. Apparently, the accompanying drawings in the following description show merely some embodiments of the present disclosure, and other drawings may be derived from these accompanying drawings by a person of ordinary skill in the art without creative efforts.

In descriptions of the embodiments of the present disclosure, orientations or position relationships indicated by terms "longitudinal", "transverse", "upper", "lower", "front", "back", "left", "right", "vertical", "horizontal", "top", "bottom", "inside", "outside", and the like are orientation or position relationships as shown in the accompanying drawings, and these terms are just used to facilitate description of the present invention and simplify the description, but not to indicate or imply that the mentioned device or elements must have a specific orientation and must be established and operated in a specific orientation, and thus, these terms cannot be understood as a limitation to the present invention.

The present disclosure is further described in detail below with reference to the accompanying drawings and specific embodiments. Embodiments cannot be described here one by one, but the embodiments of the present disclosure do not limit those described below.

Figure 1:
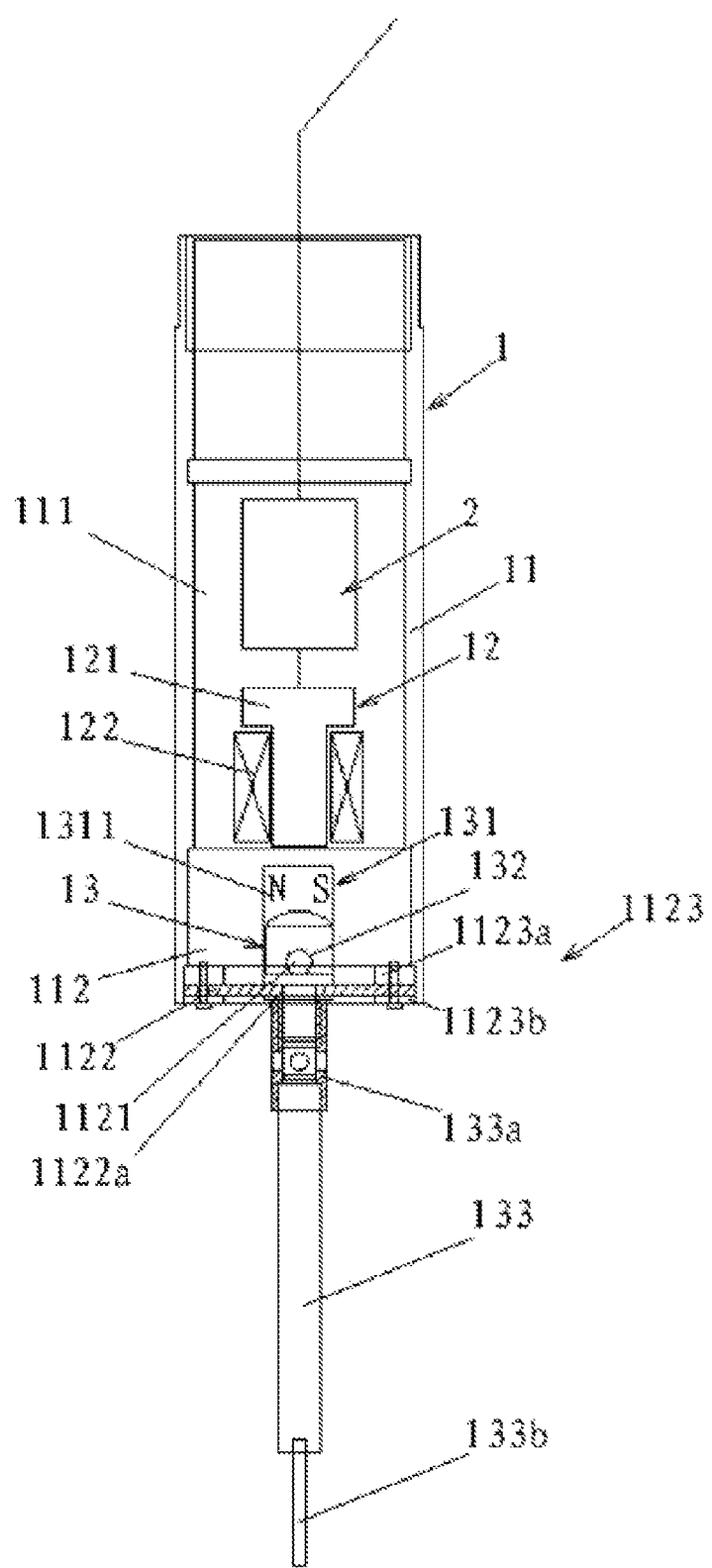
FIG. 1 is a front view of an object detection device according to one embodiment of the present disclosure.
Figure 2:
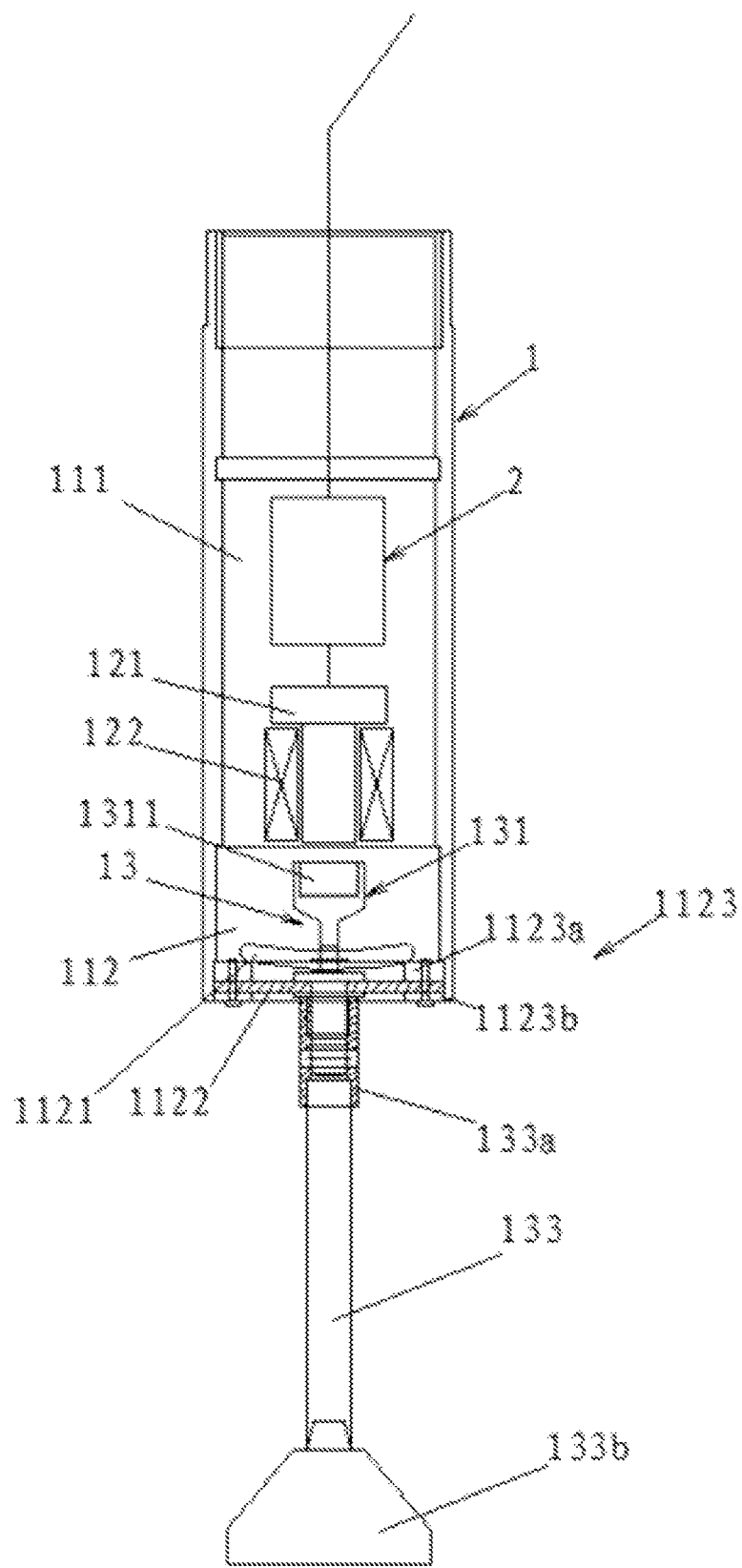
FIG. 2 is a side view of an object detection device according to one embodiment of the present disclosure.

With reference to FIG. 1 and FIG. 2, according to one embodiment of the present disclosure, an actuating mechanism for object detection of the present disclosure includes a main body 11, an electromagnetic device 12 and a swinging rod 13. In this embodiment, the electromagnetic device 12 is fixed to the main body 11 and the swinging rod 13 is movably connected to the main body 11. In this embodiment, the swinging rod 13 is swingably connected to the main body 11. That is, the swinging rod is capable of swinging on the main body 11. In this embodiment, a position of connection between the swinging rod 13 and the main body 11 is opposite to an iron core 121 of the electromagnetic device 12, and an upper end 131 of the swinging rod 13 is opposite to and spaced apart from the electromagnetic device 12. With reference to FIG. 1, in this embodiment, the position of connection between the swinging rod 13 and the main body 11 is opposite to the iron core 121 of the electromagnetic device 12 and located directly below the iron core 121, so that the upper end 131 of the swinging rod can be oriented oppositely to the iron core 121. Certainly, the position of connection between the swinging rod 13 and the main body 11 may be changed so long as the upper end 131 of the swinging rod is opposite to the iron core 121. In this embodiment, a permanent magnet 1311 is disposed on the upper end 131 of the swinging rod, and a magnetic pole direction of the permanent magnet 1311 and a magnetic pole direction of the electromagnetic device 12 cross each other. That is to say, as shown in FIG. 1, the distribution of the two poles (North pole and South pole) of the permanent magnet 1311 is not parallel to the distribution of the two poles of the electromagnetic device 12 which is in an energized state.

With reference to FIG. 1 and FIG. 2, according to one embodiment of the present disclosure, the main body 11 includes a first mounting portion 111 for mounting of the electromagnetic device 12, and a second mounting portion 112 for mounting of the swinging rod 13. In this embodiment, the first mounting portion 111 is tubular with one end sealed; and the electromagnetic device 12 is disposed on an inner side of the first mounting portion 111, while the swinging rod 13 is located on an outer side of the first mounting portion 111. In other words, the electromagnetic device 12 and the swinging rod 13 are separated by the side wall of the first mounting portion 111. As the electromagnetic device 12 is disposed in the sealed first mounting portion 111, the safety in use is improved and high explosion resistance is achieved.

With reference to FIG. 1 and FIG. 2, according to one embodiment of the present disclosure, a support shaft 1121 is disposed on the second mounting portion 112. In this embodiment, the swinging rod 13 has a first through hole 132 which extends through the body of the swinging rod. The swinging rod 13 is swingably connected to the support shaft 1121 via the first through hole 132. In this embodiment, the first through hole 132 is located below the upper end 131 of the swinging rod. In this embodiment, the support shaft 1121 is an arc-shaped shaft. The support shaft 1121 is designed to be the arc-shaped shaft so as to guarantee omnidirectional swinging of the swinging rod 13 on the support shaft 1121. Correspondingly, the diameter of the support shaft 1121 may be adjusted to be smaller than the diameter of the first through hole 132, thereby allowing for more flexible swinging of the swinging rod 13. Moreover, with the arc-shaped support shaft 1121 designed to be the arc-shaped shaft, the swinging rod 13 can be retained in the middle position of the support shaft 1121 with no external force acting thereon. It is then guaranteed that the permanent magnet 1311 on the swinging rod 13 in a free state is kept opposite to the iron core 121 of the electromagnetic device 12. Thus, when the electromagnetic device 12 is energized, the swinging rod 13 is capable of responding immediately.

With reference to FIG. 1 and FIG. 2, according to one embodiment of the present disclosure, a flexible protective cover 1122 is further disposed on the second mounting portion 112. In this embodiment, side walls of the second mounting portion 112 and the flexible protective cover 1122 define a holding cavity. The permanent magnet 1311, the upper end 131 of the swinging rod and the support shaft 1121 are all located within the holding cavity; and the end, opposite to the upper end 131, of the swinging rod 13 is located outside the holding cavity. In this embodiment, the mounting portion 112 is tubular, and a first clamping structure 1123 for mounting of flexible protective cover 1122 is disposed at one end of the second mounting portion. In this embodiment, the first clamping structure 1123 includes a first clamping piece 1123a and a second clamping piece 1123b. The first clamping piece 1123a is fixedly connected to the second mounting portion 112 and the second clamping piece 1123b is fixedly connected to the first clamping piece 1123a. The flexible protective cover 1122 is located between the first clamping piece 1123a and the second clamping piece 1123b. The flexible protective cover 1122 can be fixed and clamped via a connecting piece (e.g., a rivet, a screw) that runs through the second clamping piece 1123b, the flexible protective cover 1122 and the first clamping piece 1123a in sequence. Besides, since the connecting piece runs through the flexible protective cover 1122, the flexible protective cover 1122 can be prevented from sliding in the first clamping structure 1123, so that the stability of the position of the flexible protective cover 1122 and excellent leakproofness of the second mounting portion 112 are both guaranteed. In this embodiment, the flexible protective cover 1122 has a second through hole 1122a for the swinging rod 13 to pass through. It needs to be noted that the flexible protective cover 1122 can be provided alternatively according to requirements of actual working conditions.

With reference to FIG. 1 and FIG. 2, according to one embodiment of the present disclosure, a first connecting rod 133 is disposed on the swinging rod 13. In this embodiment, the end (i.e., the lower end of the swinging rod), opposite to the upper end 131, of the swinging rod 13 extends through the second through hole 1122a of the flexible protective cover 1122, thereby realizing detachable connection of the first connecting rod 133 and the swinging rod 13. In this embodiment, the first connecting rod 133 is in threaded connection with the swinging rod 13. A threaded connecting sleeve is disposed at an end of the first connecting rod 133 and a thread matching the threaded connecting sleeve is formed on the swinging rod 13. Thus, when the swinging rod 13 is engaged with the first connecting rod 133, the flexible protective cover 1122 is clamped at a position of connection between the swinging rod 13 and the first connecting rod 133, thereby guaranteeing the leakproofness of the position of connection and the sealing effect of the flexible protective cover 1122. In this embodiment, pin holes are formed in the swinging rod 13 and the first connecting rod 133 in positions where they are connected, respectively. When the swinging rod 13 is engaged with the first connecting rod 133, a cotter pin or a rivet is put through the pin holes in the swinging rod 13 and the first connecting rod 133 in the position of connection to prevent loosening of the swinging rod 13 and the first connecting rod 133. In this embodiment, one or more of the swinging rod 13 and the first connecting rod 133 is/are made of a diamagnetic material. In this embodiment, a catch 133b is further disposed at one end, far away from the swinging rod 13, of the first connecting rod 133. With the catch 133b, the contact area with the object detected can be increased, so that the sensitivity and accuracy of object detection can be effectively improved.

With reference to FIG. 1 and FIG. 2, according to one embodiment of the present disclosure, an object detection device of the present disclosure includes an actuating mechanism 1 and an electronic module 2. In this embodiment, the electronic module 2 is located within the first mounting portion 111 of the main body 11 and is electrically connected to the electromagnetic device 12. In this embodiment, the electronic module 2 is electrically connected to a coil 122 of the electromagnetic device 12.

Figure 3:
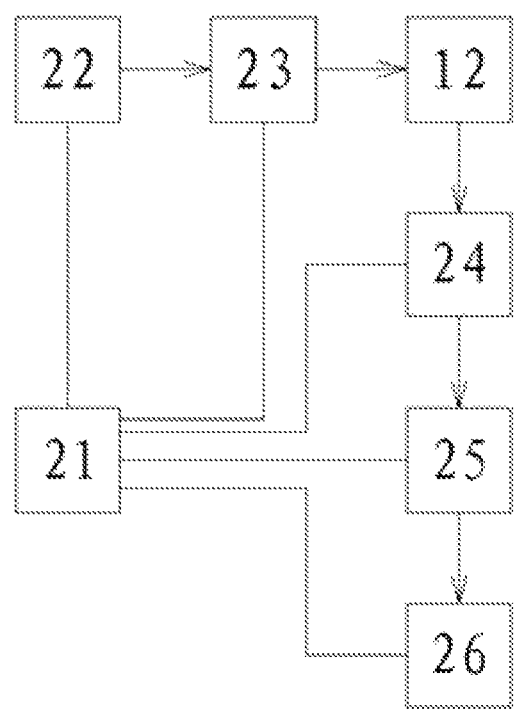
FIG. 3 is a structure diagram of an electronic module according to one embodiment of the present disclosure.

As shown in FIG. 3, according to one embodiment of the present disclosure, the electronic module 2 includes a power circuit 21, a pulse generating circuit 22, a pulse driving circuit 23, a signal amplifying circuit 24, a signal processing circuit 25, and a time-delay signal output circuit 26. In this embodiment, the pulse generating circuit 22 is connected to the pulse driving circuit 23. The pulse driving circuit 23 is connected to the coil 122 of the electromagnetic device 12, and the coil 122 is connected to the signal amplifying circuit 24. The signal amplifying circuit 24 is connected to the signal processing circuit 25. The signal processing circuit 25 is connected to the time-delay signal output circuit 26. The power circuit 21 is connected to all the other circuits. An outgoing line is connected to the time-delay signal output circuit 26 and the power circuit 21. The electromagnetic device 12 has functions of driving and signal collection. Without being stopped by materials, the swinging rod 13 is suspended below the iron core 121 of the electromagnetic device 12. After being energized, the pulse generating circuit 22 generates a pulse signal and sends it to the pulse driving circuit 23 to control flow of periodic pulse current in the coil 122, allowing the electromagnetic device 12 to generate a pulse electromagnetic field. The direction of swinging of the swinging rod 13 can be adjusted by adjusting an electrode direction of the electromagnetic device 12 and a magnetic pole direction of the electromagnetic field. Since the swinging rod 13 is suspended below the electromagnetic device 12, a driving force applied by the electromagnetic device 12 to the swinging rod 13 can be adjusted by adjusting a gap therebetween, ampere turns of the coil 122, an end area of the iron core 121 and the magnetic induction intensity of the permanent magnet 1311. Omnidirectional free swinging of the swinging rod 13 can be realized as the electromagnetic device 12 is fixed within the first mounting portion 11. When the pulse current disappears, the electromagnetic field disappears and the swinging rod 13 swings back immediately. Repeatedly, the permanent magnet 1311 installed on the upper end 131 of the swinging rod causes the magnetic flux passing through the coil 122 to change while the swinging rod 13 swings back, and then a voltage signal corresponding to the swinging of the swinging rod 13 is generated due to electromagnetic induction. The parameters such as the polarity, amplitude, width, phase, and frequency of the induced voltage signal correspond to the direction, speed, amplitude, frequency, etc., of swinging of the swinging rod 13. The swinging rod 13 is significantly differently damped in gaseous, liquid, and solid media. The damping in a gaseous medium is the smallest and can be ignored, and the induced voltage signal is the strongest. The damping in a liquid medium is moderate, and the swinging rod 13 swings relatively slower than in a gaseous medium and is retarded slightly, thus resulting in phase lag of the induced voltage signal and slight reduction in amplitude, frequency, duration and the like. The damping in a solid medium is the greatest, which stops the swinging rod from swinging and prevents generation of an induced voltage signal. The signal amplifying circuit 24 amplifies the voltage signal induced from the coil 122 and inputs it to the signal processing circuit 25. The signal processing circuit 25 can identify the presence or absence of a solid medium or a liquid medium based on distinctly different amplitudes or phases of voltage signals induced by the electromagnetic device 12 as the swinging rod 13 swings in gaseous, liquid, and solid media, and then input a position signal of the object to the time-delay signal output circuit 26. The signal is delayed for some time and then output through the outgoing line for indication, warning, automatic control, etc.

Figure 4:
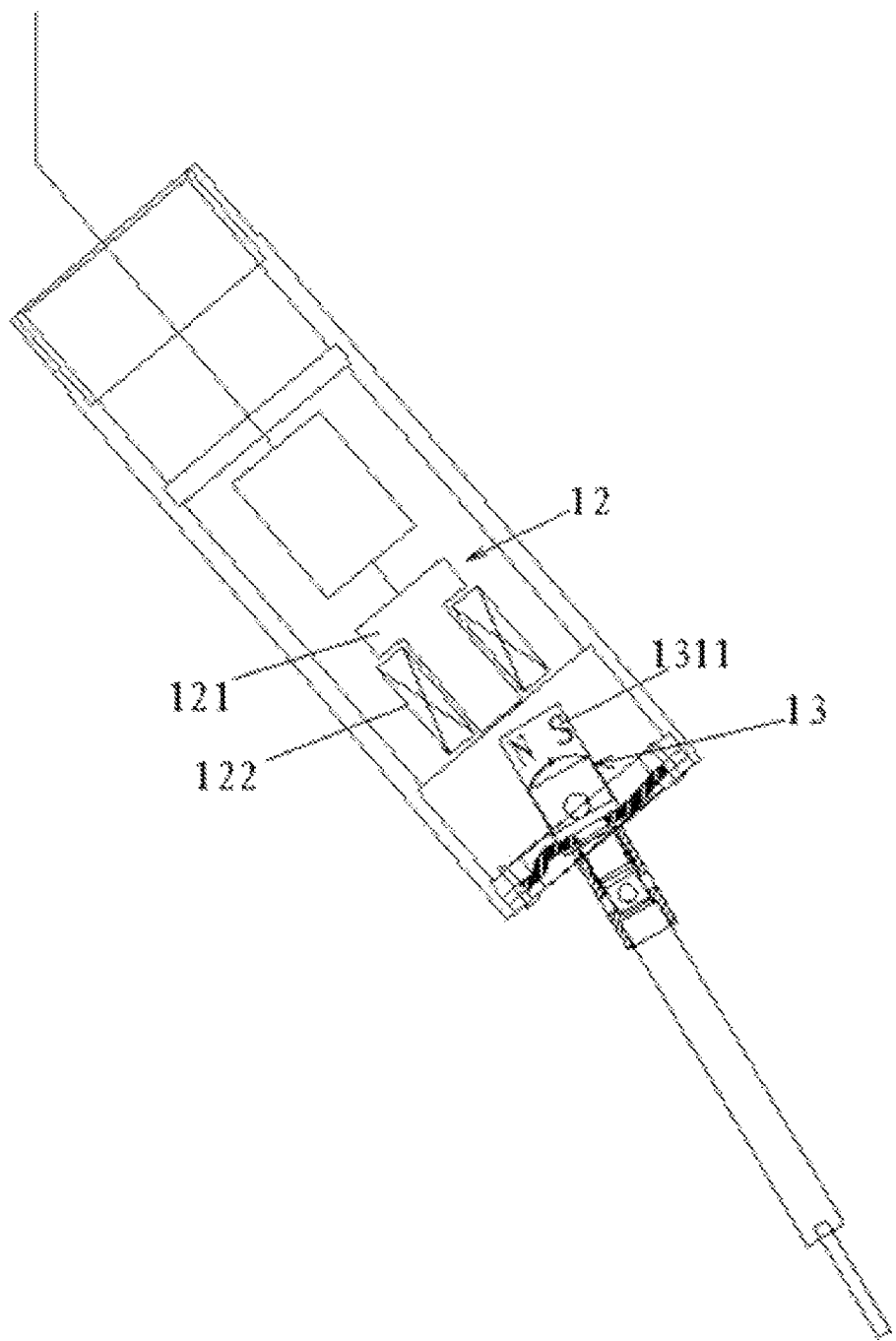
FIG. 4 is a slanting installation diagram of an object detection device according to one embodiment of the present disclosure.
Figure 5:
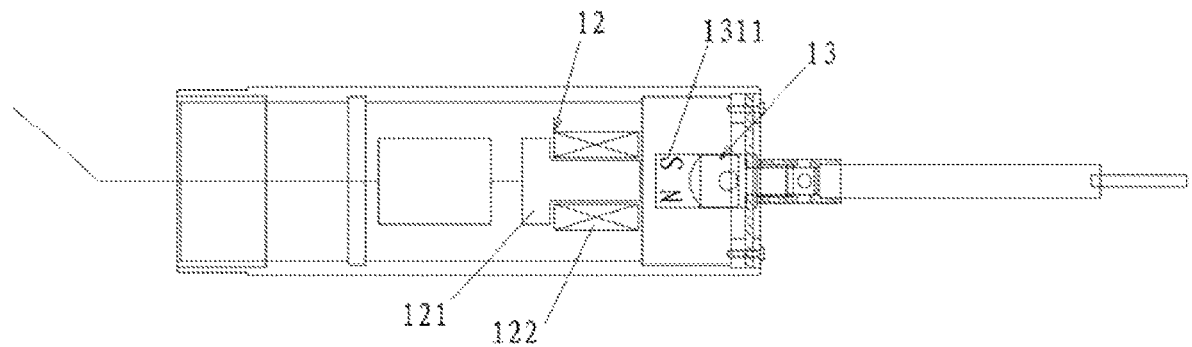
FIG. 5 is a horizontal installation diagram of an object detection device according to one embodiment of the present disclosure.

It should be noted that when the electromagnetic device 12 is not energized, with the gravity and attraction of the permanent magnet 1311 and the iron core 121 acting on the swinging rod 13, the swinging rod 13 is balanced under the action of the two forces. As shown in FIG. 1, when the object detection device of the present disclosure is vertically downward, the swinging rod 13 is in one straight line with the attraction of the iron core 121 and the gravity acting on the swinging rod 13 and passes through a swinging fulcrum (i.e., a position of connection between the swinging rod 13 and the second mounting portion 112). Referring to FIG. 4, when the object detection device of the present disclosure is installed obliquely, the swinging rod 13 will also be maintained at a corresponding oblique angle due to the attraction of the permanent magnet 1311 and the iron core 121. If the electromagnetic device 12 is energized, the electromagnetic force generated will break the equilibrium state, causing the swinging rod 13 to swing to deviate from this equilibrium state. When the electromagnetic device 12 is powered off, the swinging rod 13 will return to the previous equilibrium state. Even being placed horizontally, the swinging rod 13 can be horizontally balanced by adjusting the center-of-gravity position of the swinging rod 13 and the magnetic field strength of the permanent magnet 1311 (see FIG. 5). Therefore, since the permanent magnet 1311 is disposed at the end of the swinging rod 13 and the permanent magnet 1311 is arranged coaxially with the swinging rod 13, the object detection device of the present disclosure is enabled to perform detection in inclined and even horizontal state due to the attraction between the permanent magnet 1311 and the iron core 121 without power. Thus, the object detection device of the present disclosure can be installed at different positions to work and used in broader range of application with higher applicability.

Figure 6:
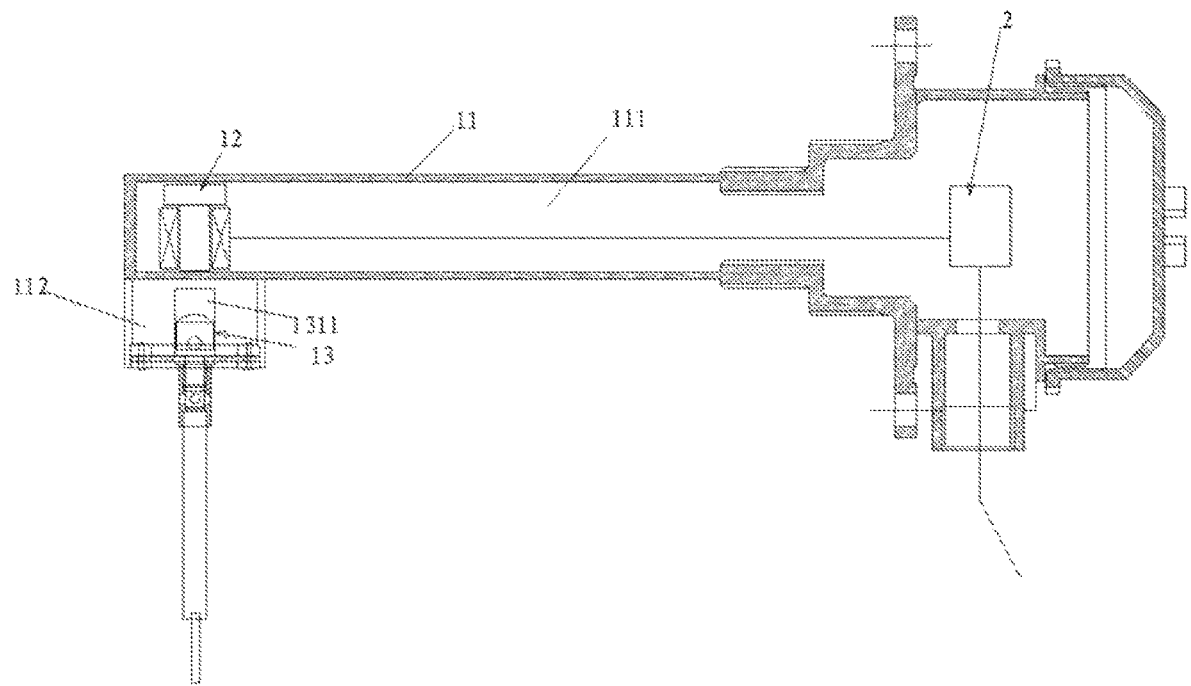
FIG. 6 is front view of an object detection device according to another embodiment of the present disclosure.

As shown in FIG. 6, according to another embodiment of the present disclosure, the main body 11 includes a first mounting portion 111 and a second mounting portion 112. The first mounting portion 111 and the second mounting portion 112 are perpendicular to each other, with components being arranged the same as in the above-described embodiment and hence not described redundantly here. Arranged in such a manner, the object detection device of the present disclosure can be installed horizontally and transversely and thus adapted to be installed on a vertical or inclined surface of a side wall of a storage bin. The installation requirements on the object detection device of the present disclosure are reduced and accurate detection results of the object detection device are ensured.

Figure 7:
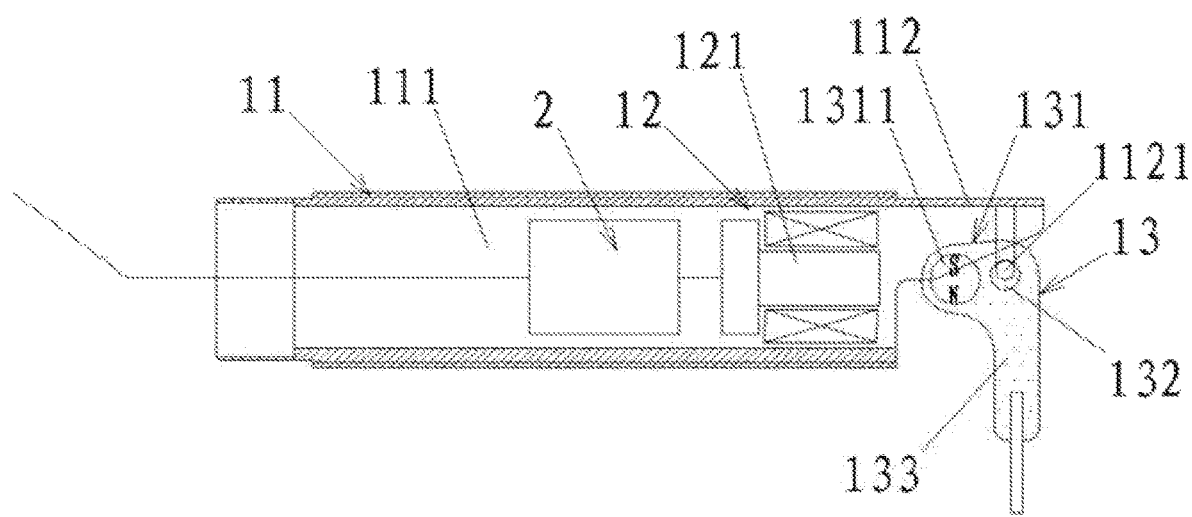
FIG. 7 is front view of an object detection device according to another embodiment of the present disclosure.

As shown in FIG. 7, according to another embodiment of the present disclosure, the main body 11 includes the first mounting portion 111 and the second mounting portion 112. In this embodiment, the second mounting portion 112 is open and designed to be an arc-shaped side wall, and the support shaft 1121 is fixed to the second mounting portion 112. In this embodiment, an extension arm is disposed on one side of the upper end 131 of the swinging rod 13, so that the swinging rod 13 is L-shaped as a whole. The permanent magnet 1311 is disposed on the extension arm on one side of the upper end 131 of the swinging rod. The first through hole 132 of the swinging rod 13 is connected to the support shaft 1121, and the position of connection is opposite to an electromagnetic device 12. The permanent magnet 1311 is also located between the electromagnetic device 12 and the support shaft 1121, and the permanent magnet 1311 is disposed opposite to an iron core 121 of the electromagnetic device 12, thus guaranteeing excellent detection effect of the object detection device of the present disclosure. With reference to FIG. 7, in this embodiment, a position of connection between the swinging rod 13 and the main body 11 is opposite to the iron core 121 of the electromagnetic device 12 and located on the right side of the iron core 121, so that the permanent magnet 1311 can be oriented oppositely to the iron core 121. Certainly, the position of connection between the swinging rod 13 and the main body 11 may be changed so long as the permanent magnet 1311 is opposite to the iron core 121. In this embodiment, a first connecting rod 133 disposed on the swinging rod 13 and the swinging rod 13 are integrated, which, certainly, can also be separated. In addition, since the second mounting portion 112 is open, a flexible protective cover 1122 can be disposed alternatively thereon as required. Other components are arranged the same as in the above-described embodiment and hence not described redundantly here. Arranged in such a manner, the object detection device of the present disclosure can be installed horizontally and transversely and thus adapted to be installed on a vertical or inclined surface of a side wall of a storage bin. The installation requirements on the object detection device of the present disclosure are reduced and accurate detection results of the object detection device are ensured.

Figure 8:
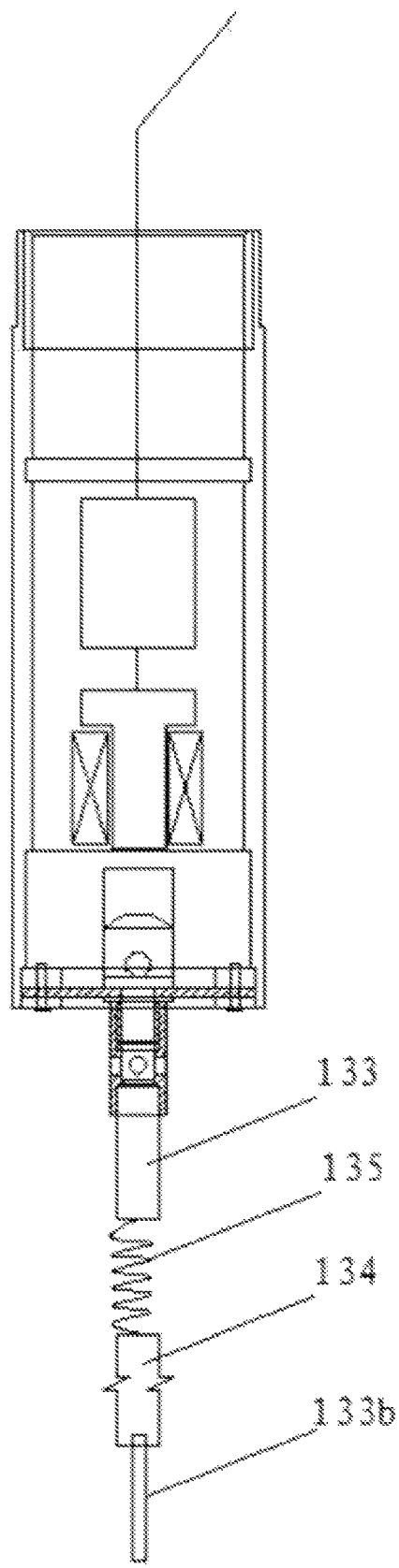
FIG. 8 is front view of an object detection device according to another embodiment of the present disclosure.

With reference to FIG. 8, according to another embodiment of the present disclosure, a second connecting rod 134 is further disposed on the swinging rod 13. In this embodiment, the second connecting rod 134 is coaxially connected to the first connecting rod 133 via an elastic piece 135. With the second connecting rod 134, the length of the first connecting rod 133 can be effectively increased. In addition, the elastic piece 135 is disposed between the connected second connecting rod 134 and first connecting rod 133, and with the elastic piece 135, a flexible connection is formed between the second connecting rod 134 and the first connecting rod 133. Thus, when being acted upon by excessive impact of detected materials or excessive lateral pressure of the detected materials, the second connecting rod 134 would undergo just elastic deformation rather than permanent deformation that may affect the reliability of detection, thereby guaranteeing the working stability of the object detection device. In this embodiment, the catch 133b is disposed at the end, far away from the first connecting rod 133, of the second connecting rod 134. With the catch 133b, the contact area with the object detected can be increased, so that the sensitivity and accuracy of object detection can be effectively improved.

According to one embodiment of the present disclosure, one or more of the swinging rod 13, the first connecting rod 133 and the second connecting rod 134 is/are made of a diamagnetic material. With the permanent magnet 1311 on the swinging rod 13, during the detection process, if the detected object is magnetic or contains magnetic impurities, the object or impurities can be adhered to the swinging rod 13, the first connecting rod 133 and the second connecting rod 134, thereby seriously affecting the detection accuracy. Therefore, by using the diamagnetic material, adhesion of magnetic particles onto the swinging rod 13, the first connecting rod 133 and the second connecting rod 134 can be avoided, thus ensuring the detection accuracy.

According to the present disclosure, since the permanent magnet 1311 on the swinging rod 13 is opposite to and spaced apart from the electromagnetic device 12, the swinging rod 13 is not in contact with the electromagnetic device 12 during working process. This avoids knocking of the swinging rod 13 on other components, and therefore prevents noise, reduces wear, and improves the explosion-proof safety level. Since the swinging rod 13 is suspended below the electromagnetic device 12, a driving force applied by the electromagnetic device 12 to the swinging rod 13 can be conveniently and efficiently adjusted by adjusting a gap therebetween, ampere turns of the coil 122, an end area of the iron core 121 and the magnetic induction intensity of the permanent magnet 1311. Besides, cost saving is achieved.

According to the present disclosure, since the permanent magnet 1311 is disposed at the end of the swinging rod 13, the object detection device of the present disclosure is enabled to perform detection in inclined and even horizontal state due to the attraction between the permanent magnet 1311 and the iron core 121 without power. The requirements on the perpendicularity of installation are reduced, and the object detection device can work reliably even when being inclined to a horizontal position. Thus, the object detection device of the present disclosure can be installed at different positions to work and used in broader range of application with higher applicability.

According to the present disclosure, since the magnetic pole direction of the permanent magnet 1311 and the magnetic pole direction of the electromagnetic device 12 cross each other, since only one end of the iron core 121 is opposite to the permanent magnet 1311, the electromagnetic driving force generated by the electromagnetic device 12 after being energized produces not only repelling force but also attraction with the permanent magnet 1311, so that the electromagnetic driving force is doubled. Thus, the size of the electromagnetic device 12 can be greatly reduced, leading to material saving, reduction in production, transportation and storage costs as well as great reduction in power consumption. Furthermore, a two-wire product with micro-power consumption can be developed and manufactured, resulting in reduction of wiring cost of installation in use and energy saving. In addition, because the swinging of the swinging rod 13 causes the magnetic flux in the coil 122 to change not only in the magnitude of the magnetic flux but also in the direction, the signal of the swinging of the swinging rod 13 collected after the electromagnetic device 12 is powered off is also multiplied, which in turn makes the detection accuracy and sensitivity higher.

According to the present disclosure, with the flexible protective cover 1122, the permanent magnet 1311 on the swinging rod 13 can be isolated from the detected object, and therefore, such components as the swinging rod 13, the first connecting rod 133 and the second connecting rod 134 can be made of a diamagnetic material, so that the object detection device of the present disclosure can be used in detecting ferromagnetic materials (such as iron, cobalt, nickel and other materials) and materials with high adhesion.

According to the present disclosure, because only the swinging rod 13 of the object detection device of the present disclosure is in contact with materials, the obstruction to the normal flow of the detected materials is reduced, and cavities formed by the arching and bridging of detected materials are also reduced. Also, the leftover of the detected materials on the object detection device of the present disclosure is reduced and the reliability of signal output is improved.

The foregoing are merely descriptions of examples of specific embodiments of the present disclosure. For those equipment and structure not described in detail herein, it should be construed as being implemented using existing general-purpose equipment and general-purpose methods in the art. The foregoing is merely illustrative of one embodiment of the present disclosure and is not intended to limit the present disclosure, and various changes and modifications may be made by those skilled in the art. Any modifications, equivalent replacements, improvements and the like made within the spirit and principle of the present disclosure shall be included within the protection scope of the present application.

What is claimed is:

1. An actuating mechanism for object detection, comprising a main body (11), an electromagnetic device (12) fixed to the main body (11), and a swinging rod (13) swingably connected to the main body (11), wherein
a position of connection between the swinging rod (13) and the main body (11) is opposite to an iron core of the electromagnetic device (12), and an upper end (131) of the swinging rod (13) is opposite to and spaced apart from the electromagnetic device (12);
a permanent magnet (1311) is disposed on the upper end (131) of the swinging rod; and a magnetic pole direction of the permanent magnet (1311) and a magnetic pole direction of the electromagnetic device (12) cross each other;
the main body (11) comprises a first mounting portion (111) for mounting of the electromagnetic device (12), and a second mounting portion (112) for mounting of the swinging rod (13);
the first mounting portion (111) is tubular with one end sealed; and the electromagnetic device (12) is disposed on an inner side of the first mounting portion (111), while the swinging rod (13) is located on an outer side of the first mounting portion (111).

2. The actuating mechanism according to claim 1, wherein a support shaft (1121) is disposed on the second mounting portion (112); the swinging rod (13) has a first through hole (132) which extends through a body of the swinging rod; and the swinging rod (13) is swingably connected to the support shaft (1121) via the first through hole (132).

3. The actuating mechanism according to claim 2, wherein the support shaft (1121) is an arc-shaped shaft.

4. The actuating mechanism according to claim 2, wherein a flexible protective cover (1122) is further disposed on the second mounting portion (112);
side walls of the second mounting portion (112) and the flexible protective cover (1122) define a holding cavity; the permanent magnet (1311), the upper end (131) of the swinging rod and the support shaft (1121) are all located within the holding cavity; and an end, opposite to the upper end (131), of the swinging rod (13) is located outside the holding cavity.

5. The actuating mechanism according to claim 4, wherein the second mounting portion (112) is tubular, and a first clamping structure (1123) for mounting of the flexible protective cover (1122) is disposed at one end of the second mounting portion; and
the flexible protective cover (1122) has a second through hole (1122a) for the swinging rod (13) to pass through.

6. The actuating mechanism according to claim 5, wherein a first connecting rod (133) is disposed on the swinging rod (13);
the first connecting rod (133) is detachably connected to the swinging rod (13), and the flexible protective cover (1122) is clamped at a position of connection between the swinging rod (13) and the first connecting rod (133).

7. The actuating mechanism according to claim 6, wherein a second connecting rod (134) is further disposed on the swinging rod (13);
the second connecting rod (134) is coaxially connected to the first connecting rod (133) via an elastic piece (135).

8. The actuating mechanism according to claim 6, wherein at least one of the swinging rod (13), the first connecting rod (133) and the second connecting rod (134) is made of a diamagnetic material.

9. An object detection device having the actuating mechanism according to claim 1, comprising the actuating mechanism (1), and an electronic module (2) electrically connected to the electromagnetic device (12) in the actuating mechanism (1).

* * * * *